United States Patent
Sudbrink et al.

(10) Patent No.: US 10,542,657 B2
(45) Date of Patent: Jan. 28, 2020

(54) ROCKSHAFT AND FRAME IN AN AGRICULTURAL IMPLEMENT

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 365 days.

(21) Appl. No.: 15/148,426

(22) Filed: May 6, 2016

(65) Prior Publication Data

US 2017/0318731 A1   Nov. 9, 2017

(51) Int. Cl.
*A01B 63/22* (2006.01)
(52) U.S. Cl.
CPC .................................. *A01B 63/22* (2013.01)
(58) Field of Classification Search
CPC ...................................................... A01B 63/22
USPC ........................................................ 172/423
See application file for complete search history.

(56) References Cited

U.S. PATENT DOCUMENTS

| | | | |
|---|---|---|---|
| 3,015,259 A | | 1/1962 | Apel et al. |
| 3,356,382 A | * | 12/1967 | Fay .................. A01B 63/22 172/316 |
| 3,534,819 A | * | 10/1970 | Grover ............. A01B 23/043 172/316 |
| 3,754,383 A | | 8/1973 | Burrough et al. |
| 3,759,332 A | * | 9/1973 | Robertson, Sr. ..... A01B 21/083 172/239 |
| 3,777,823 A | * | 12/1973 | Holfeld ............. A01B 63/22 172/328 |
| 3,860,075 A | | 1/1975 | Morris |
| 4,011,711 A | | 3/1977 | Mast |
| 4,249,365 A | | 2/1981 | Hubbard et al. |
| 4,359,106 A | | 11/1982 | Nevarez |
| 4,444,271 A | | 4/1984 | Dietrich, Sr. |
| 4,492,272 A | | 1/1985 | Jensen |
| 4,546,832 A | * | 10/1985 | Dietrich et al. ..... A01B 61/046 172/260.5 |
| 4,871,028 A | | 10/1989 | Murray |
| 5,476,075 A | | 12/1995 | Doll et al. |
| 5,535,832 A | * | 7/1996 | Benoit ................ A01B 49/02 172/195 |
| 5,983,615 A | | 11/1999 | Schmid et al. |
| 6,397,953 B1 | * | 6/2002 | Ankenman ........... A01B 51/04 172/445.1 |

(Continued)

OTHER PUBLICATIONS

"Kongskilde 8200 Field Cultivator—Assembly/Parts" retrieved from www.kongskilde.com on Mar. 7, 2016 (74 pages).

(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

An agricultural implement has a main frame including fore-to-aft and cross frame members. Main lift and transport wheels are connected to rockshaft pedestal arms that are pivotally connected to the main frame by way of a rockshaft held by the main frame. The rockshaft is held spanning a distance between upper and lower fore-to-aft frame member components.

14 Claims, 4 Drawing Sheets

(56) References Cited

U.S. PATENT DOCUMENTS

| | | |
|---|---|---|
| 6,732,812 B1 | 5/2004 | Royer |
| 6,752,094 B1 | 6/2004 | Truax |
| 6,932,512 B2 | 8/2005 | Cox et al. |
| 8,286,566 B2 | 10/2012 | Schilling et al. |
| 2014/0116736 A1* | 5/2014 | Dietrich, Sr. ........ A01B 61/044 172/664 |
| 2014/0262370 A1 | 9/2014 | Kohn et al. |
| 2015/0129254 A1* | 5/2015 | Sudbrink et al. ........ A01B 3/26 172/1 |

OTHER PUBLICATIONS

"9600 Field Cultilvator", Landoll, retrieved from http://landoll.com on Mar. 7, 2016 (8 pages).
"John Deere 845—Cultivator, Row-Crop 845 Series Folding Row-Crop Cultivator", retrieved from http://777parts.net on Mar. 7, 2016 (2 pages).
"1435 Disc Harrow", Sunflower Manufacturing, retrieved from www.google.com on Mar. 7, 2016 (1 page).

* cited by examiner

ROCKSHAFT AND FRAME IN AN AGRICULTURAL IMPLEMENT

BACKGROUND OF THE INVENTION

1. Field of the Invention

The present invention relates generally to agricultural implements, and, more particularly, to the frames, lift and depth control mechanisms for agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of tilling soil and leveling the tilled soil in a single pass during preparation for planting. A field cultivator has a frame that carries a number of cultivator shanks with shovels at their lower ends for tilling the soil. The field cultivator converts compacted soil into a level seedbed with a consistent depth for providing desired conditions for planting of a crop. Grass or residual crop material disposed on top of the soil is also worked into the seedbed so that it does not interfere with a seeding implement subsequently passing through the seedbed. Tillage equipment also can prepare the soil by way of mechanical agitation of various types, such as digging, stirring, and overturning. Examples of such include ploughing (overturning with moldboards or chiseling with chisel shanks), rototilling, rolling with cultipackers or other rollers, harrowing, and cultivating with cultivator shanks.

In addition to a frame and sub frames carrying the field working devices, wheels are often integral with tillage implements and are used for both transportation of the implement on roads and between fields, and for depth control of the tillage implements when working in a field. Accordingly, during field operation, the main lift wheels ride over the field surface, while supporting the frame system that in turn carries the field working devices, such as cultivator shanks, that are pulled over and through the seedbed. In this configuration, the frame rides relatively close to the soil surface. Because the operating widths of tillage implements are generally too wide to travel on roads between fields, tillage implements may be operable to fold up into a folded transport configuration, so that portions or wings of the framework that carries the field working devices, such as cultivator shanks, are stacked on top of, or otherwise carried by the center frame section of the tillage implement that also carries field working devices of its own, such as cultivator shanks. In this configuration, hydraulic cylinders and lift wheel arms elevate the frame and sub frames along with associated equipment carried thereon, with the center frame and field working devices elevated substantially above the surface over which the wheels transport the implement. It is known to use a structure commonly referred to as a rockshaft connected by levers and arms between the transport wheel assemblies, the implement frame, and hydraulic actuators connected thereto to effect relative rotational changes of the rockshaft to raise and lower the mainframe relative to the transport wheel assemblies.

In known tillage implements, frame components typically are constructed of relatively single piece components, such as tubes, extending for to aft and others extending side to side, which can be connected by welding or the like. Rockshafts have been mounted to the frame either above or below the fore-to-aft frame components. Either of the alternative mounting locations for the rockshaft can result in disadvantages or undesirable effects.

With the rockshaft positioned above the frame, a long pedestal arm is required in order to maintain ground clearance for the machine. With a long pedestal arm, the pivot moves forward, and can create weight distribution difficulties within the machine. On a constant level machine, inconsistent weight distribution can result in the hitch clevis moving up and down in the tractor drawbar. On a floating hitch unit, the improper weight distribution can result in wheel wobble and can increase the tendency of the machine to tip.

With the rockshaft positioned below the frame, the structure is carried closer to the ground surface, which can lead to congestion for residue flow through the machine. Further, a shorter pedestal is created. To accommodate the elevational travel distance between maximum working depth and the desired clearance during road transport, the arc through which rotation occurs becomes larger, and the hydraulic cylinders and linkage arms require a greater range of motion to perform adequately.

What is needed in the art is a rockshaft and frame arrangement that minimizes the disadvantages that occur when the rockshaft is mounted either above or below the frame.

SUMMARY OF THE INVENTION

Embodiments of the present invention provide an agricultural implement having a rockshaft that is attached transverse to but in substantial level position with the fore-to-aft frame members of the center frame. A set of lift wheels is connected thereto by pedestal arms. An actuator is connected to the rockshaft by a linkage system so that operation of the actuator effects changes in the relative rotational relationship of the rockshaft and lift wheels to the frame.

The invention in one form is directed to an agricultural implement provided with a frame carrying field working devices, lift wheels supporting the frame, an actuator; and a rockshaft disposed in an interconnecting relationship between the frame, the lift wheels and the actuator to effect relative rotational movement between the frame and the lift wheels upon operation of the actuator. The rockshaft is held by the frame and in substantial alignment with the frame.

The invention in another form is directed to an agricultural implement provided with a frame carrying field working devices, the frame including first and second spaced, fore-to-aft trusses, and cross members connecting the trusses. Lift wheels support the frame. A rockshaft is disposed transverse to and in vertical alignment with the trusses, and a rockshaft pedestal arm is connected between the lift wheels and the rockshaft.

The invention in still another form is directed to an agricultural implement provided with a frame carrying field working devices, the frame including first and second spaced fore-to-aft frame members each having an upper surface and a lower surface. A rockshaft is disposed between the first and second spaced fore-to-aft frame members and is connected thereto below the upper surfaces thereof and above the lower surfaces thereof. A lift and transport wheel supports the frame, and a rockshaft pedestal arm is connected between the lift and transport wheel and the rockshaft.

One advantage of the present invention is that the rockshaft is located in the middle of the frame elevation, thereby increasing machine stability over that achieved with the rockshaft located either above or below the frame.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
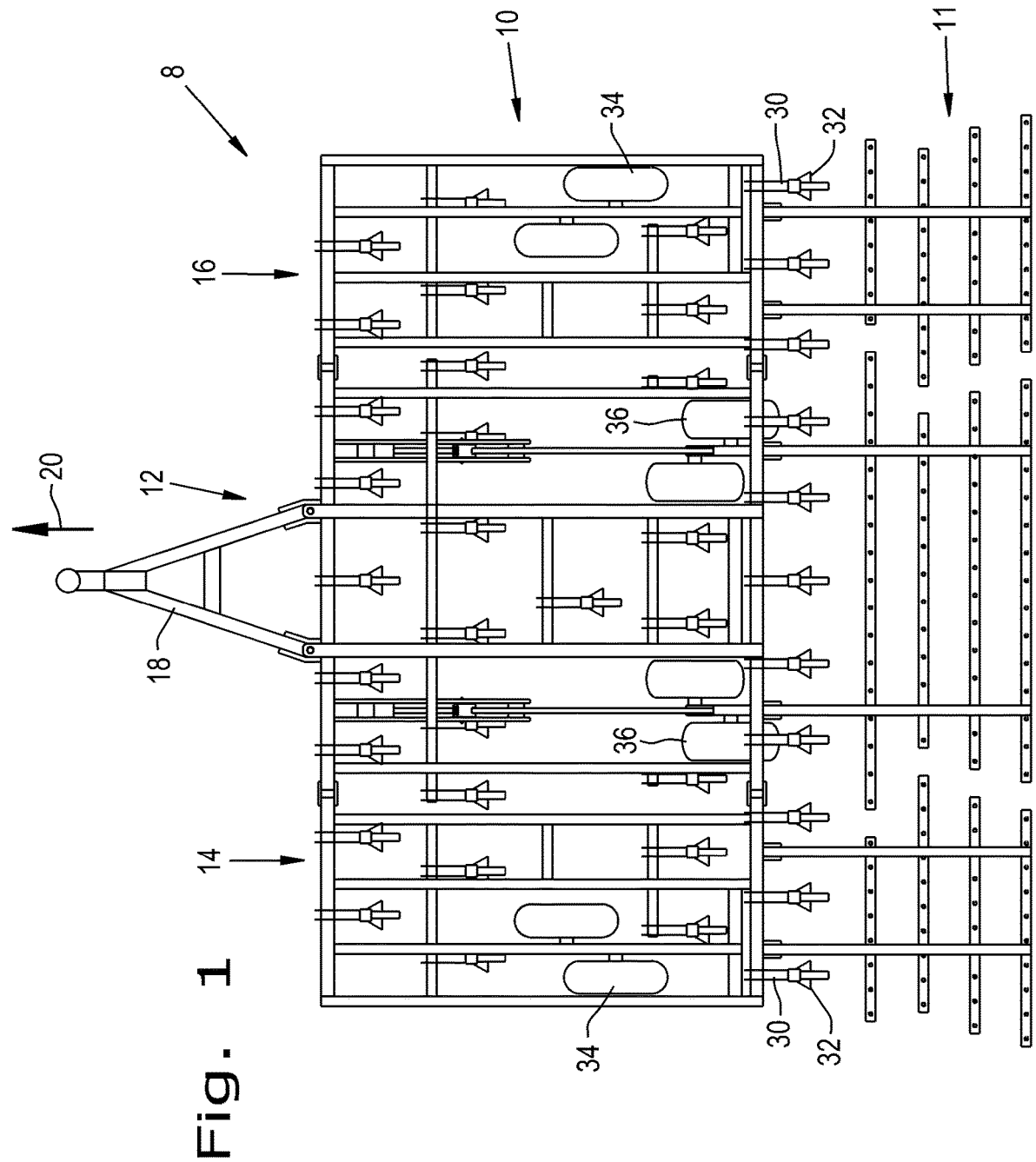
FIG. 1 is a top schematic illustration of an agricultural tillage implement in which the rockshaft and frame as disclosed herein can be used.

Referring now to the drawings, and more particularly to FIG. 1, there is shown a schematic illustration of an embodiment of an agricultural tillage implement 8, which can incorporate the rockshaft and frame disclosed herein. In the illustrated embodiment, the tillage implement 8 includes cultivator 10 and a harrow 11 for tilling soil prior to seeding. Field cultivator 10 is configured as a multi-section field cultivator, and includes a center frame section 12 and wing sections 14 and 16. Center frame section 12 is the center section that is towed directly by a traction unit, such as an agricultural tractor (not shown). A pull hitch 18 extends forward from center frame section 12 and is coupled with the traction unit in known manner so that the traction unit can tow implement 8 in a travel direction indicated by arrow 20.

Center frame section 12 and wing sections 14, 16 generally function to carry field working devices such as cultivator shanks 30 with shovels 32 at the lower ends thereof for tilling the soil as implement 8 is pulled in direction 20. Shanks 30 are carried by frames including fore-to-aft frame members and lateral frame members of the center frame section 12 and wing sections 14, 16. Wing lift wheels 34 are provided for wing sections 14, 16. Main lift and transport wheels 36 are provided for center frame section 12. Front gauge wheels 38 (FIG. 4) can be provided for some or all of center frame section 12 and wing sections 14, 16. As known to those skilled in the art, in preparation for transport, wing sections 14, 16 can be raised, with wing lift wheels 34 off the ground, to narrow the overall width of implement 10 for transport.

Figure 2:
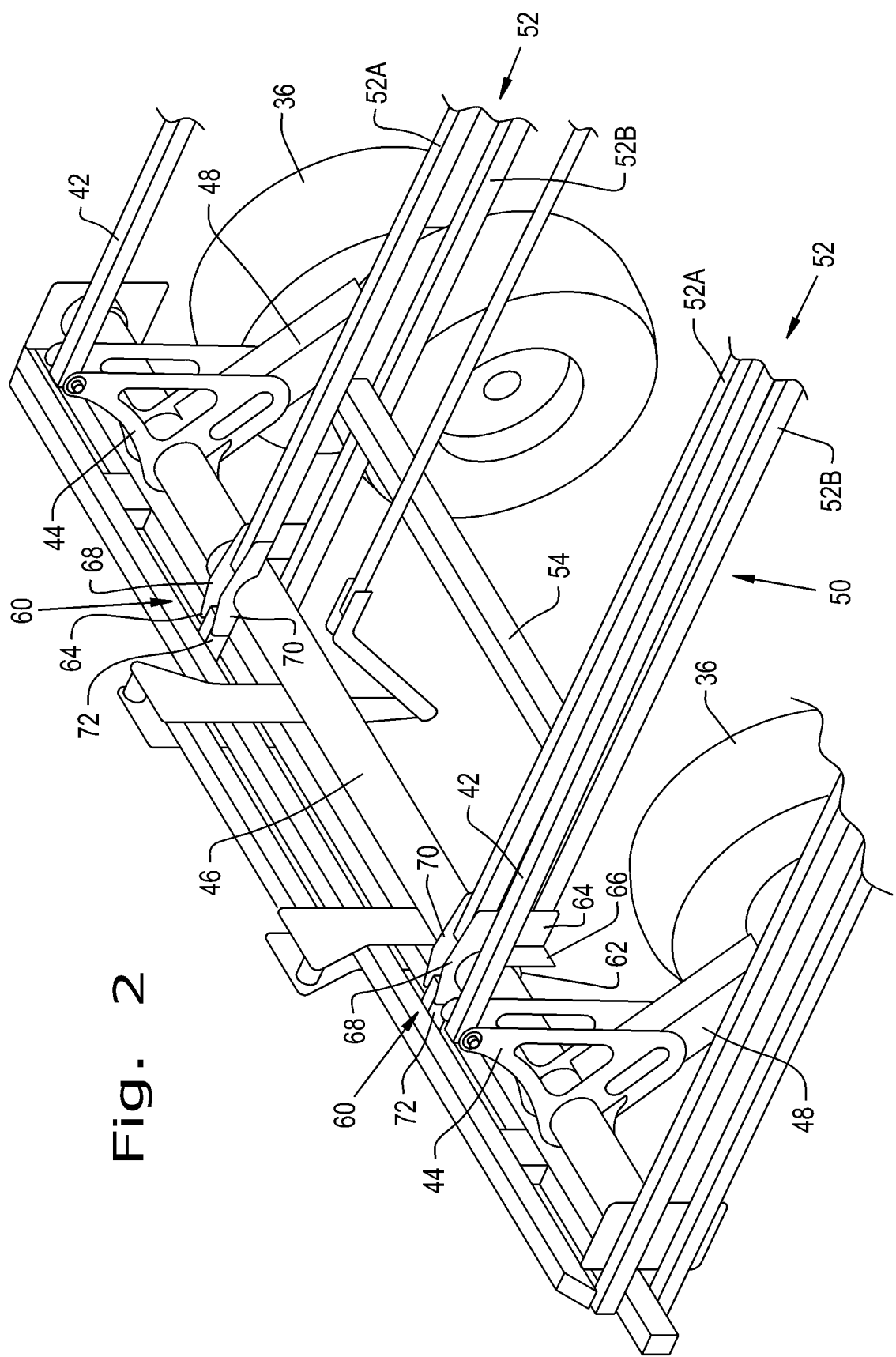
FIG. 2 is a partial top front isometric view of a center frame section of an agricultural tillage implement according to an embodiment of the invention.
Figure 3:
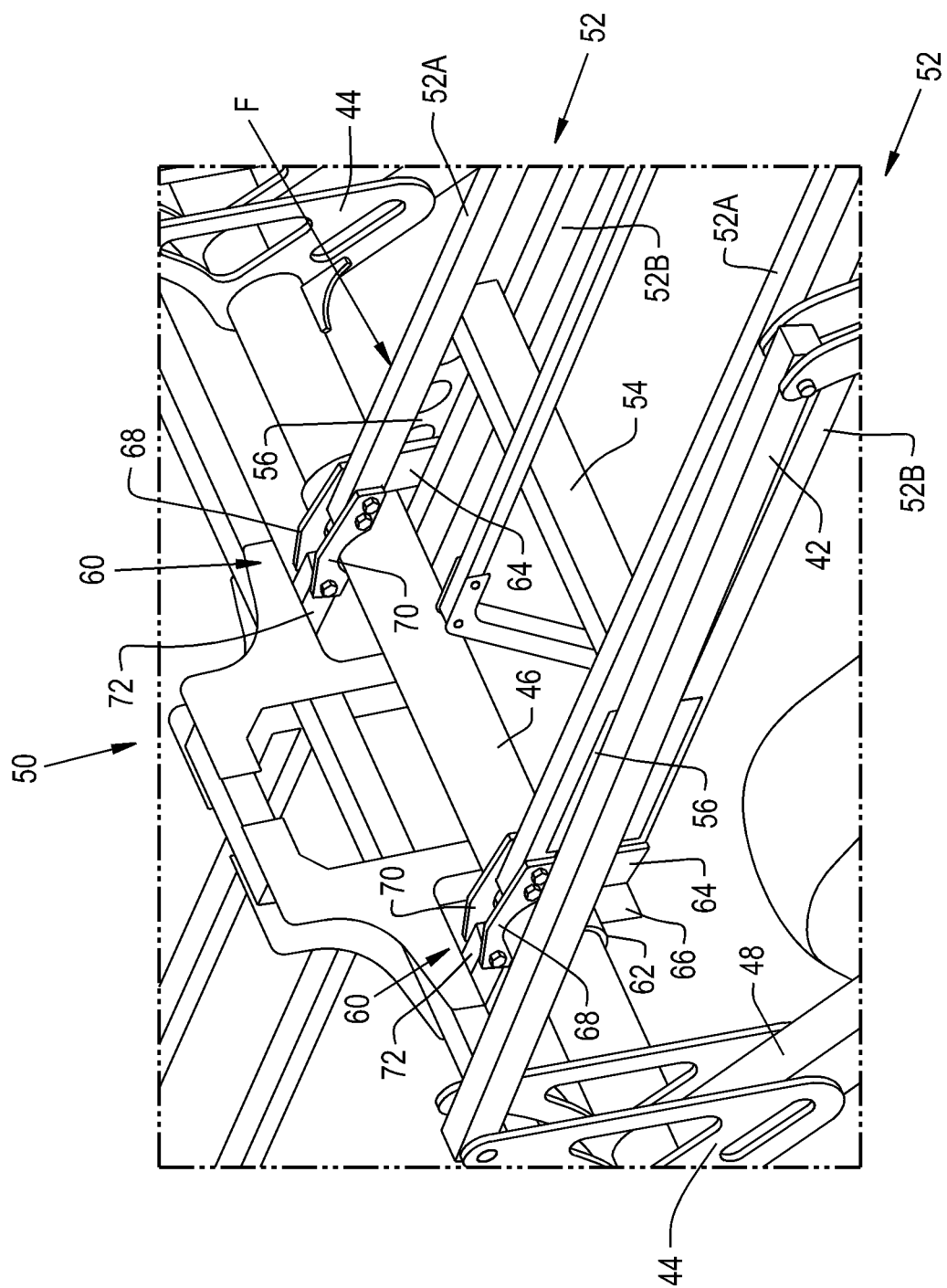
FIG. 3 is another partial top front isometric view the center frame section.
Figure 4:
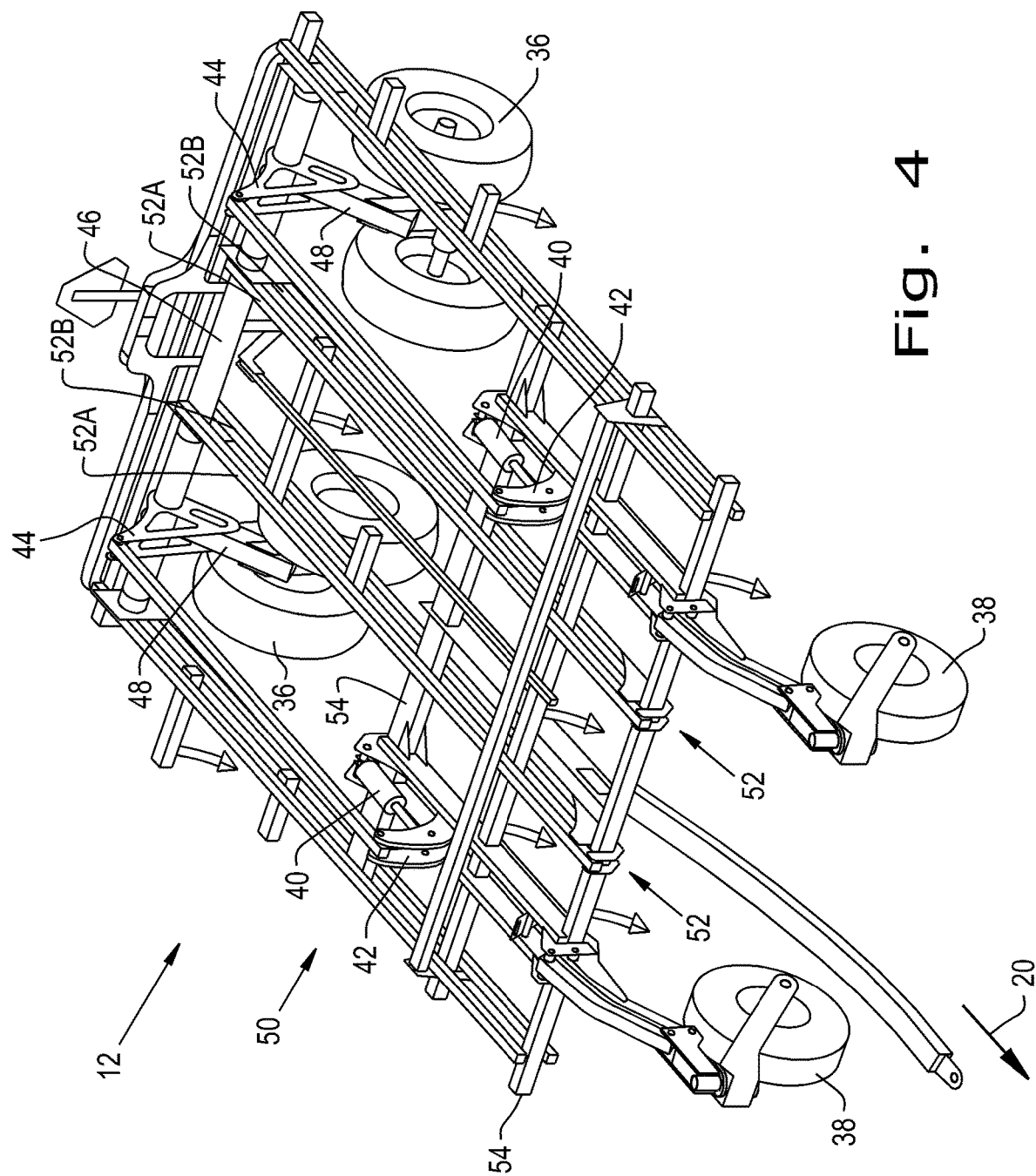
FIG. 4 is a top front isometric view of the full center frame section.

Referring now additionally to FIGS. 2-4, main lift and transport wheels 36 are used for raising and lowering a shank carrying frame 50 of center frame section 12 through the operation of one or more hydraulic lift cylinder or actuator 40 connected to main lift and transport wheels 36 through a linkage system or shaft 42. Through linkage system or shaft 42, actuators 40 operate cranks 44 on a rockshaft 46, to cause relative angular movement of the rockshaft 46 and the main lift and transport wheels 36 relative to frame 50. A rockshaft pedestal arm 48 is connected to and between each set of main lift and transport wheels 36 and rockshaft 46 by way of connection to operating cranks 44, which are also connected to rockshaft 46. Rockshaft 46 coordinates motion between multiple rockshaft pedestal arms 48, two such pedestal arms 48 being shown in the exemplary embodiment.

Rockshaft 46 is held by and in center frame section 12, generally in vertical alignment with frame 50. That is, rockshaft 46 is held neither generally above nor below center frame section 12 but in substantially aligned relationship there with. Accordingly, shank carrying frame 50 of center frame section 12 includes at least a pair of spaced fore-to-aft (longitudinal) frame members 52 and at least a pair of cross frame members 54 extending from one of the fore-to-aft frame members to the other of the fore-to-aft frame members. Fore-to-aft frame members 52 may be in the form of trusses, each including a fore-to-aft frame member upper component 52A, and a fore-to-aft frame member lower component 52B provided in vertically spaced relationship to one another. In each fore-to-aft frame member 52, the upper component 52A thereof and the lower component 52B extends the length thereof and define upper and lower surfaces, respectively, of the fore-to-aft frame member 52. The upper component 52A and lower component 52B of each fore-to-aft frame member 52 can be interconnected to one another by plates 56 and/or by the perpendicular cross frame members 54 at several locations along the length of the frame members 52.

Upper component 52A and lower component 52B are held a vertically spaced distance apart by plates 56 and/or by the perpendicular cross members 54 disposed of there between. In the exemplary embodiment, rockshaft 46 is held above lower component 52B and spans the vertically spaced distance between upper component 52A and lower component 52B. Accordingly, rockshaft 46 is held transverse to but in vertical alignment with frame members 52.

Each frame member 52 defines a cage 60 for capturing rockshaft 46 therein. Cage 60 includes a base 62 beneath rockshaft 46 and at least one side plate 64 of generally inverted U-shaped configuration. Plate 64 may further include a laterally extending flange 66. Plate 64 is connected to both upper component 52A and lower component 52B along one side of frame 52. Plate 64 further includes an arched top 68 extending over the top and down the sides of rockshaft 46. Plate 64 is fastened to base 62. At an opposite side of frame member 52 from plate 64, an arched link 70 is connected to upper component 52A and thereby to plate 64 and extends therefrom over rockshaft 46 and is connected again to plate 64 through a frame member 72. Additional frame elements can be joined to plate 64, arched link 70 and frame member 72. Rockshaft 46 is thereby captured and contained within cage 60, generally above lower component 52B and generally below upper component 52A, including the extensions thereof included in cage 60, such as base 62 of lower component 52B and arched top 68 and arched link 70 of upper component 52A.

Rockshaft 46 extends from one of the fore-to-aft frame members 52 to the other of the fore-to-aft frame members 52 and is held therein and thereby within the aforedescribed features of cages 60. Rockshaft 46 is held between the upper and lower extremes of fore-to-aft frame member 52, including the extensions thereof forming cage 60, such as base 62 of lower component 52B and arched top 68 as well as arched link 70 of the upper component and 52A. Accordingly, rockshaft 46 extends neither above the upper surface nor below the lower surface and spans the distance separating upper component 52A and lower component 52B. Positioned in this manner, between the upper and lower components, provides improved operating performance compared to heretofore known arrangements having the rockshaft attached above the frame or below the frame by shortening the required rotational arc without clogging space below the frame.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
   a frame carrying field working devices;
   lift wheels supporting the frame;
   an actuator; and
   a rockshaft disposed in an interconnecting relationship between the frame, the lift wheels and the actuator to effect relative rotational movement between the frame and the lift wheels upon operation of the actuator, the rockshaft being held by and in general alignment with the frame, the frame including
      a pair of upper and lower frame members which are positioned parallel relative to each other, and which are longitudinally aligned with a travel direction,
      a rockshaft plate connected to an upper frame member of the pair of upper and lower frame members, the rockshaft plate positioned across an upper portion and against lateral sides of an outer perimeter of the rockshaft, the rockshaft plate including
         a lateral flange which is positioned perpendicularly relative to the rockshaft plate, the lateral flange extending downward near the rockshaft to connect to a lower frame member to the rockshaft plate,
         a base plate which extends under and against a lower portion of the rockshaft, the base plate connected to the rockshaft plate, wherein the rockshaft plate forms a cage about the outer perimeter of the rockshaft, and
         a connector plate which is positioned next to the rockshaft plate and extends a distance forward therefrom, the connector plate positioned against and connected to each of the pair of upper and lower frame members.

2. The agricultural implement of claim 1, wherein the upper frame member of the pair of upper and lower frame members is positioned above the rockshaft and the lower frame member of the pair of upper and lower frame members is positioned below the rockshaft, and wherein the lateral flange of the rockshaft plate extends in a position in front of the rockshaft in an parallel alignment with the rockshaft.

3. The agricultural implement of claim 2, wherein at least a rear frame member in longitudinal alignment with the upper frame member of the pair of upper and lower frame members is connected to the rockshaft plate and extends behind the rockshaft, and wherein the rockshaft extends a distance transversely relative to the pair of upper and lower frame members.

4. The agricultural implement of claim 1, including a crank on the rockshaft and a linkage system between the crank and the actuator.

5. The agricultural implement of claim 2, wherein a lower edge of the rockshaft plate is positioned above the outer perimeter of the rockshaft and the lower edge conforms to at least a portion thereof.

6. The agricultural implement of claim 1, including a rockshaft pedestal arm connected between the rockshaft and the lift wheels.

7. The agricultural implement of claim 6, including a crank on the rockshaft and a linkage system between the crank and the actuator.

8. The agricultural implement of claim 1, wherein the frame includes cross members and the pair of upper and lower frame members are connected to the cross members.

9. An agricultural implement, comprising:
   a frame carrying field working devices;
   lift and transport wheels supporting the frame;
   an actuator;
   a rockshaft disposed in an interconnecting relationship between the frame, the lift wheels and the actuator to effect relative rotational movement between the frame and the lift wheels upon operation of the actuator, the rockshaft being held by and in general alignment with the frame, the frame including
      a pair of upper and lower frame members which are positioned parallel relative to each other, and which arm longitudinally aligned with a travel direction,
      a rockshaft plate connected to an upper frame member of the pair of upper and lower frame members, the rockshaft plate positioned across an upper portion and against lateral sides of an outer perimeter of the rockshaft, the rockshaft plate including
         a lateral flange extending downward near and in front of the rockshaft to connect to a lower frame member to the rockshaft plate, and
         a base plate which extends under and against a lower portion of the rockshaft, the base plate connected to the rockshaft plate, wherein the rockshaft plate forms a cage about the outer perimeter of the rockshaft, and
   a rockshaft pedestal arm connected between the lift and transport wheels and the rockshaft.

10. The agricultural implement of claim 9, wherein the upper frame member of the pair of upper and lower frame members is positioned above the rockshaft and the lower frame member of the pair of upper and lower frame members is positioned below the rockshaft, and wherein the lateral flange of the rockshaft plate extends in a position in parallel alignment with the rockshaft and perpendicularly relative to the rockshaft plate.

11. The agricultural implement of claim 10, wherein the at least a rear frame member in longitudinal alignment with the upper frame member of the pair of upper and lower frame members is connected to the rockshaft plate and extends behind the rockshaft, and wherein the rockshaft extends a distance transversely relative to the pair of upper and lower frame members.

12. The agricultural implement of claim 9, including a crank on the rockshaft and a linkage system between the crank and the actuator.

13. The agricultural implement of claim 10, wherein a lower edge of the rockshaft plate is positioned above the outer perimeter of the rockshaft and the lower edge conforms to at least a portion thereof.

14. The agricultural implement of claim 9, wherein the frame includes cross members connected between the pair of upper and lower frame members, and wherein a connector plate is positioned next to the rockshaft plate and extends a distance forward therefrom, the connector plate positioned against and connected to the pair of upper and lower frame members.

* * * * *